Nov. 2, 1926.
A. F. MASURY
1,605,365
VEHICLE FRAME CONSTRUCTION
Filed Feb. 18, 1926
3 Sheets-Sheet 1
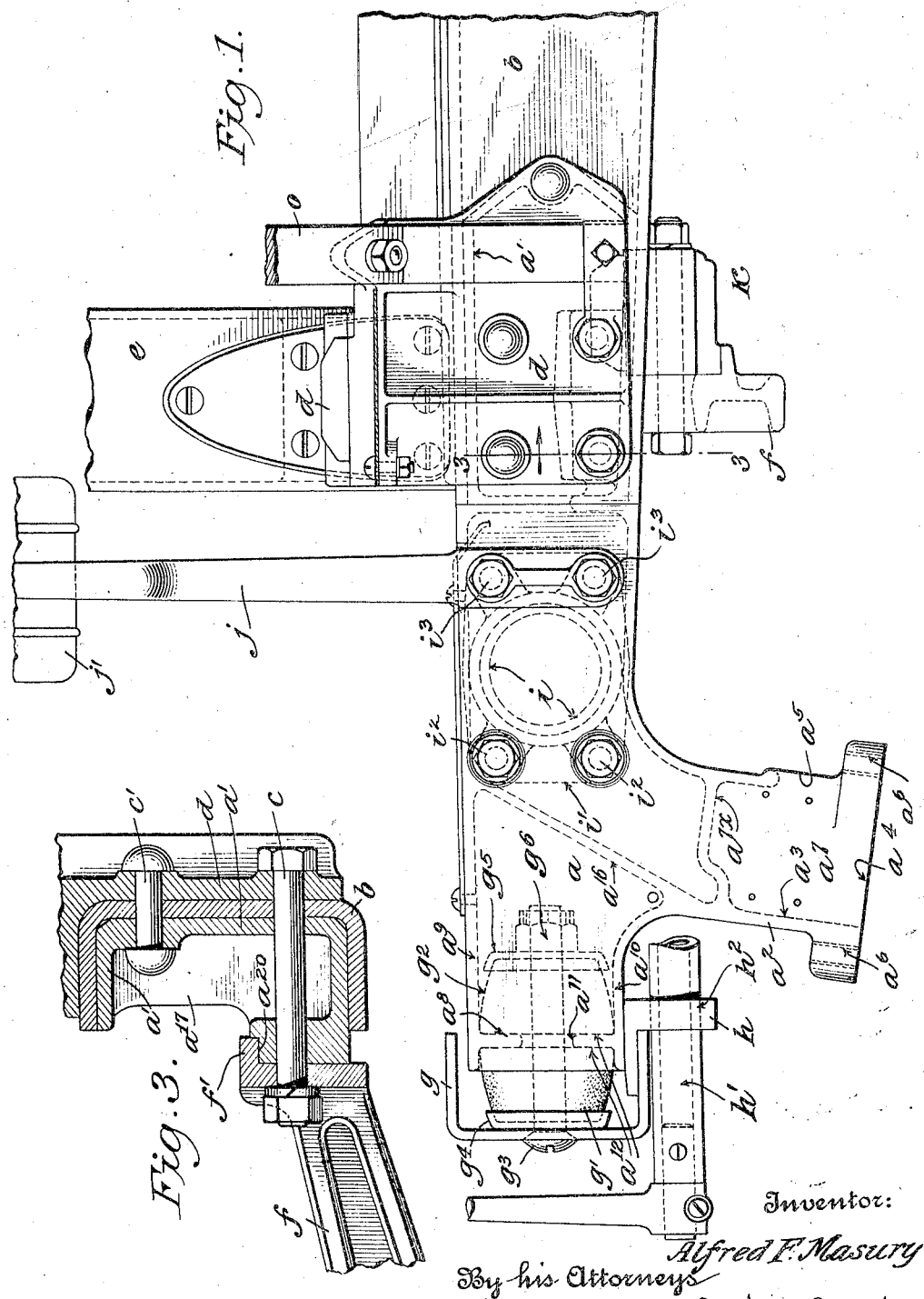
Inventor:
Alfred F. Masury
By his Attorneys
Redding, Greeley, O'Shea & Campbell Nov. 2, 1926.
A. F. MASURY
1,605,365
VEHICLE FRAME CONSTRUCTION
Filed Feb. 18, 1926   3 Sheets-Sheet 2
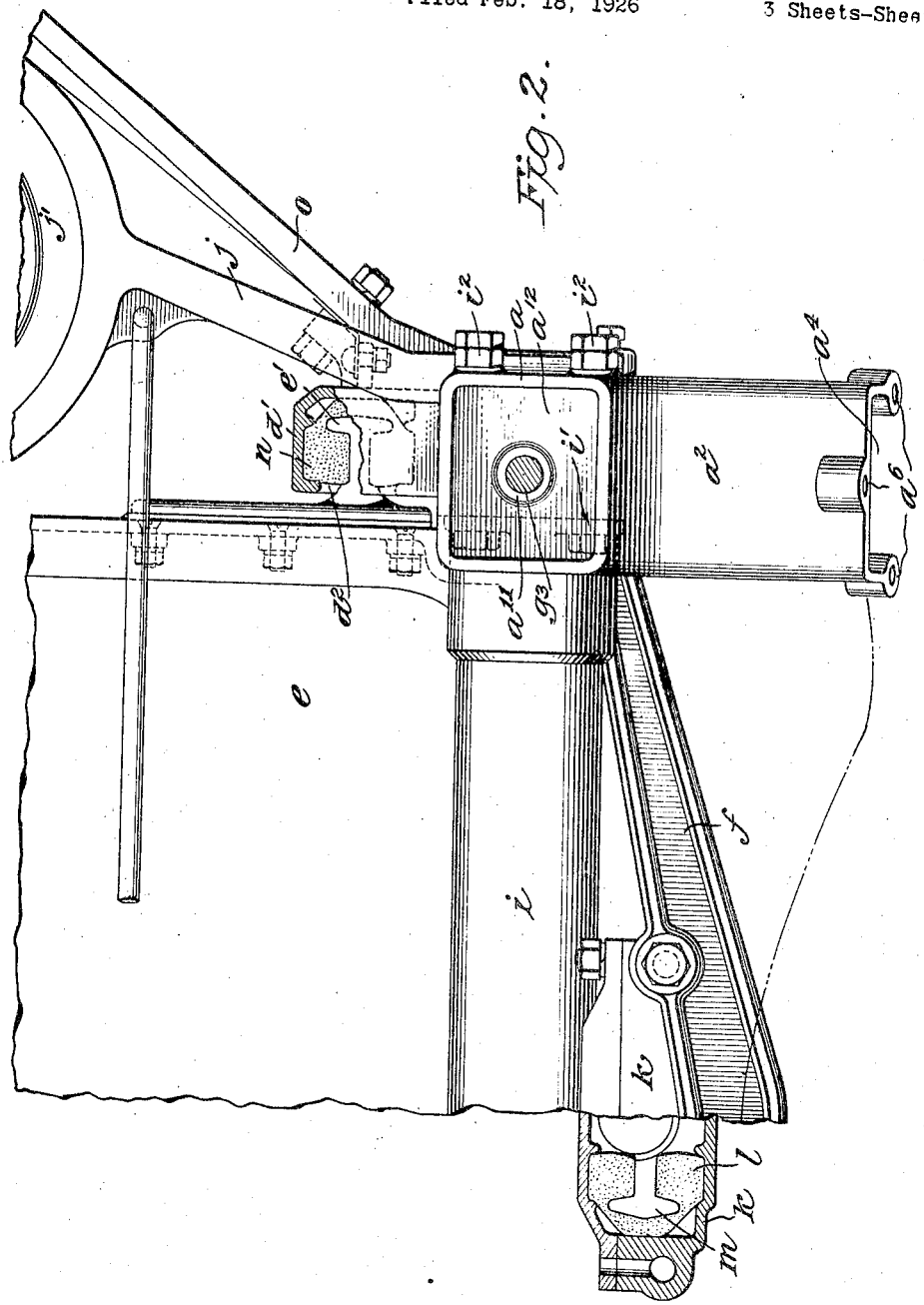
Inventor:
Alfred F. Masury
By his Attorneys Nov. 2, 1926.

A. F. MASURY 1,605,365

VEHICLE FRAME CONSTRUCTION

Filed Feb. 18, 1926    3 Sheets-Sheet 3

Inventor:
Alfred F. Masury
By his Attorneys
Redding, Greeley, O'Shea & Campbell

Patented Nov. 2, 1926.

1,605,365

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

VEHICLE FRAME CONSTRUCTION.

Application filed February 18, 1926. Serial No. 88,984.

In the manufacture of motor vehicles under conditions of standardized automotive practice any reorganization of the chassis frame structure tending to simplify manufacturing and assembling operations constitutes a marked improvement in the art. This is particularly the case with the vehicle frames designed for motor busses and trucks of large capacities where the longitudinal side frame members, for instance, are of such size and length as to involve difficulty in handling during the machine operations necessary in the formation of such elements as spring horns and cross member supports.
At the same time the front ends of the side frame members must be adapted to receive and support a plurality of devices such as spring brackets, bumpers, fenders, the radiator, motor and the like. The present invention has for its object to overcome the difficulty now experienced in forming supports for the various devices directly upon the relatively long side frame members by the provision of a supplemental end formed with seats for the different elements at the front end of the vehicle and adapted to be rigidly secured to the longitudinal side frame members upon assembly of the chassis. More particularly a unitary casting forging or stamping is provided, as an article of manufacture, which may be readily secured to the front end of each side frame member and which is formed with seats for all the elements at the front end of the vehicle frame. In the preferred embodiment it is contemplated incorporating the front end casting according to the present invention in a chassis construction involving cushion connections between the vehicle springs and the chassis frame according to the patent to Alfred F. Masury and August H. Leipert No. 1,404,876 dated January 31, 1922. To this end a downwardly depending housing section to contain the yielding non-metallic material is formed on the casting and provision is also made for supporting the engine and radiator and the front cross frame member of the chassis. In order that the invention may be clearly understood and readily carried into effect the same will now be described more fully with reference to the accompanying drawings illustrating a preferred embodiment in which:

Figure 1 is a view in side elevation showing the supplemental front end according to the present invention and the devices supported thereby.

Figure 2 is a view in front elevation showing the front end according to Figure 1.

Figure 3 is a view taken in the plane indicated by the line 3—3 in Figure 1 and looking in the direction of the arrow and showing the manner of securing the supplemental front end to the side frame member and the manner in which the front cross frame member is supported.

Figure 4:
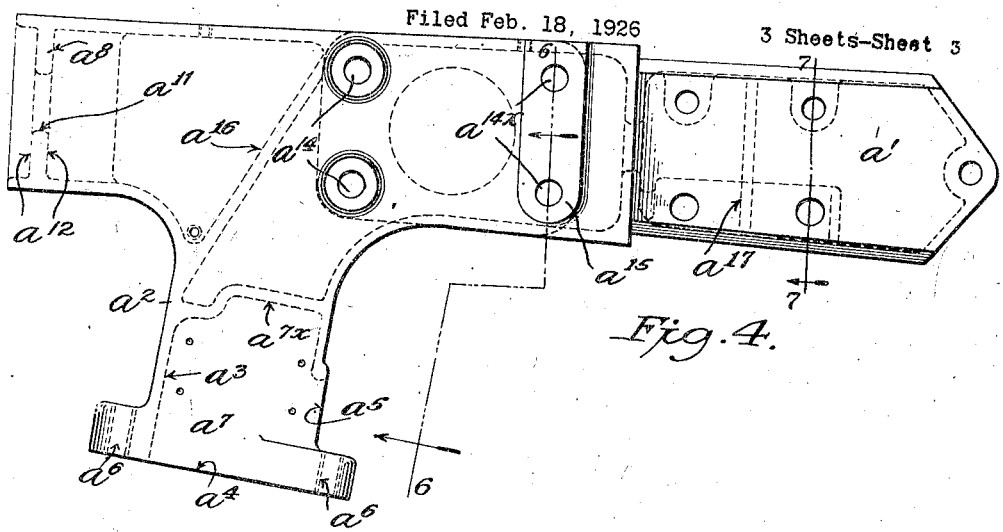
Figure 4 is a view in side elevation showing the supplemental front end as an article of manufacture without the supporting and supported elements associated therewith.
Figure 5:
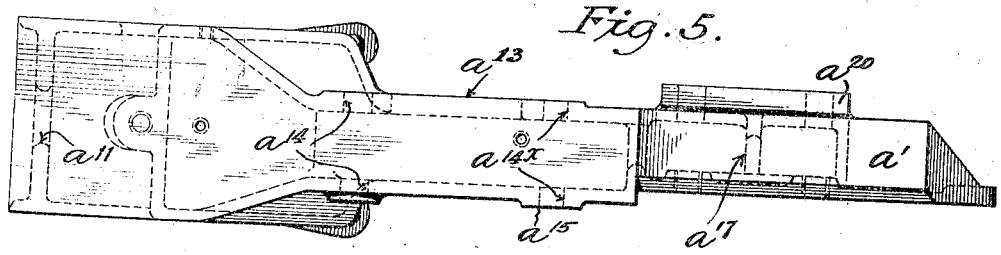
Figure 5 is a view in plan showing the casting looking from above in Figure 4.
Figure 6:
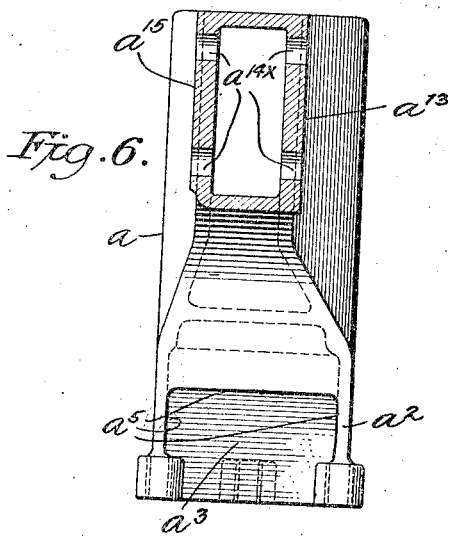
Figure 6 is a transverse vertical view partly in section and partly in elevation showing the casting and taken in the plane indicated by the broken line 6—6 in Figure 4 and looking in the direction of the arrows.
Figure 7:
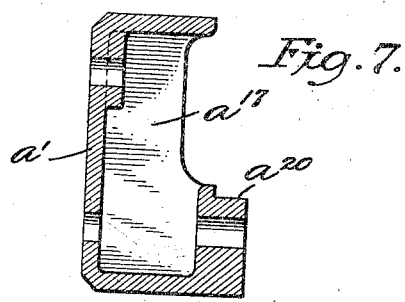
Figure 7 is a fragmentary view taken in the plane indicated by the line 7—7 in Figure 4 and looking in the direction of the arrow and showing the form taken by the supplemental end at that portion at which it is secured to the longitudinal side member of the chassis frame.

The supplemental front end indicated at $a$ as a whole in Figure 4 is shown in Figures 1, 2 and 3 as secured to the front end of a channel-shaped side frame member $b$ by the disposition within the channel of a reduced channel-shaped portion $a'$ secured thereto by bolts or rivets $c$, $c'$ respectively, which may also be used to secure outwardly of frame member $b$ a bracket $d$ for the support of the vehicle radiator $e$, the bolt $c$ also securing the front cross frame member $f$ which is formed with the flange $f'$ to seat within and be supported by a recessed portion $a^{20}$ on the front end member. This member $f$ is also utilized as supporting means for the front end of the motor, a housing $k$ being illustrated in Figures 1 and 2 as supported centrally thereof adapted to receive blocks of yielding non-metallic material $l$ supporting a bearing member $m$ serving as the front single point of support for the motor, not shown. The bracket $d$ which supports the radiator $e$ is preferably provided with a separable housing $d'$ adapted to contain yielding non-metallic material $n$ which engages an arm $e'$ secured to the radiator and entering the housing through an aperture $d^2$. Bracket $d$ may also be availed of as a base for the support of the fender bracket $o$.

The front end is also adapted to have secured thereto the front end of a vehicle spring. To this end suitable provision is made for a connection and support for the spring end associated with the frame member. In the preferred embodiment the frame member is formed with a downwardly projecting portion $a^2$ formed at its lowermost end with a recess $a^3$ open below as at $a^4$ and rearwardly as at $a^5$. The recess $a^3$ thus forms the upper half of a housing for a cushion connection of the character described in the patent before referred to, the spring end entering through the aperture $a^5$ and the open side $a^4$ facilitating the insertion of a block of yielding non-metallic material in known manner, which block is retained within the recess $a^3$ by a closure not shown which may be secured to the depending portion $a^7$ by means of bolts passing through the bolt holes $a^6$. In order to position the block of yielding non-metallic material within the housing and obtain the required degree of compression in the material the recess $a^3$ may be formed with seats $a^{7x}$ within which portions of the yielding block are retained.

Forwardly of the housing portion $a^2$ the frame and member is adapted to receive and support a bumper $g$. This bumper extends completely across the front of the vehicle in well known manner and is adapted to be yieldingly maintained in position on the front ends of the frame members by cushion connections illustrated in Figure 1 as comprising annular tapering blocks $g'$, $g^2$ of yielding non-metallic material disposed upon opposite sides of a flange $a^8$ formed between the upper and lower webs $a^9$, $a^{10}$, respectively, of the front end member and formed with an aperture $a^{11}$ for a bolt $g^3$ passing through the rubber rings $g'$, $g^2$. In the interest convenience in assembly and to contribute to the positioning of the bumper and the maintenance of the blocks of yielding non-metallic material under the desired degree of compression seat members $g^4$, $g^5$ may be disposed on the inner face of the bumper and on the end of the bolt against which the nut $g^6$ bears as clearly shown in Figure 1 and if desired seats $a^{12}$ associated with the flange $a^8$ may also be provided for the proximate faces of the respective rubber blocks. In the illustrated embodiment the bumper is also illustrated as provided with a depending bracket element $h$ serving as a support for the outer end of the starting crank $h'$ which passes through an aperture $h^2$ in the bracket member.

The front end member is also adapted to support a tubular cross frame member $i$ secured thereto by the engagement of its end $i'$ with a seat portion $a^{13}$ against which it is held by bolts $i^2$, $i^3$ passing through apertures $a^{14}$, $a^{14x}$. The bolts may also be availed of to secure the standard $j$ supporting the lamp $j'$ the lower end of the standard being formed with a flat engaging portion adapted to engage with the seat $a^{15}$ formed outwardly of the front end member.

It will thus be seen that a supplemental front end is provided by the construction described which is readily applied to the end of the channel forming the side member of a vehicle frame. The front end frame member has been illustrated as a casting as such will likely be most advantageous in manufacture since by a casting operation the desired shape and the provision of a reenforcing web as shown at $a^{16}$ which extends downwardly and forwardly from the point of fastening of the cross brace $i$ to the region of the housing portion $a^2$ and the vertical brace $a^{17}$ which re-enforces the end at its point of connection with the chassis frame can be easily attained.

Various modifications may be made in the composition and configuration of the front end frame member forming the subject matter of the present invention as well as in the manner of mounting or securing the various elements thereto and no limitation is intended by the foregoing phraseology or description except as indicated in the appended claims.

What I claim is:

1. As an article of manufacture, a unitary front end member for a chassis frame having a reduced channel-shaped portion to be secured to the frame member, a downwardly depending housing portion for a cushion connection with a vehicle spring, and a seat for a cross frame member.

2. As an article of manufacture, a unitary front end member for a chassis frame having a reduced channel-shaped portion to be secured to the frame member, a downwardly depending housing portion for a cushion connection with a vehicle spring, and a seat for a yielding non-metallic connection with a bumper.

3. As an article of manufacture, a unitary front end member for a chassis frame having a reduced channel-shaped portion to be secured to the frame member, a downwardly depending housing portion for a cushion connection with a vehicle spring, and a seat for a radiator.

4. As an article of manufacture, a unitary front end member for a chassis frame having a reduced channel-shaped portion to be secured to the frame member, a downwardly depending housing portion for a cushion connection with a vehicle spring, and a seat for a support for the front end of a motor.

5. As an article of manufacture a unitary front end member for a chassis frame having a reduced channel-shaped portion to be secured to the frame member, a downwardly depending housing portion for a cushion connection with a vehicle spring, a seat for a cross frame member and a seat for a yielding non-metallic connection with a bumper.

6. As an article of manufacture a unitary front end member for a chassis frame having a reduced channel-shaped portion to be secured to the frame member, a downwardly depending housing portion for a cushion connection with a vehicle spring, a seat for a cross frame member, and a seat for a radiator.

7. As an article of manufacture a unitary front end member for a chassis frame having a reduced channel-shaped portion to be secured to the frame member, a downwardly depending housing portion for a cushion connection with a vehicle spring, a seat for a cross frame member and a seat for a support for the front end of a motor.

8. As an article of manufacture, a unitary front end member for a chassis frame having a reduced channel-shaped portion to be secured to the frame member, a downwardly depending housing portion for a cushion connection with a vehicle spring, a seat for a yielding non-metallic connection with a bumper, and a seat for a radiator.

9. As an article of manufacture, a unitary front end member for a chassis frame having a reduced channel-shaped portion to be secured to the frame member, a downwardly depending housing portion for a cushion connection with a vehicle spring, a seat for a yielding non-metallic connection with a bumper, and a seat for a support for the front end of a motor.

10. As an article of manufacture, a unitary front end member for a chassis frame having a reduced channel-shaped portion to be secured to the frame member, a downwardly depending housing portion for a cushion connection with a vehicle spring, a seat for a radiator, and a seat for a support for the front end of a motor.

11. As an article of manufacture, a unitary front end member for the longitudinal side frame member of the chassis frame having a reduced channel-shaped portion to be secured to the frame member, a downwardly depending housing portion for a cushion connection with a vehicle spring, a seat for a cross frame member, a seat for a radiator and a seat for a support for the front end of a motor.

12. As an article of manufacture, a unitary front end member for a chassis frame having a reduced channel-shaped portion to be secured to the frame member, a downwardly depending housing portion for a cushion connection with a vehicle spring, a seat for a cross frame member, a seat for a radiator, and a seat for a yielding non-metallic connection with a bumper.

13. As an article of manufacture, a unitary front end member for a chassis frame having a reduced channel-shaped portion to be secured to the frame member, a downwardly depending housing portion for a cushion connection with a vehicle spring, a seat for a cross frame member, a seat for a support for the front end of a motor, and a seat for a yielding non-metallic connection with a bumper.

14. As an article of manufacture, a unitary front end member for a chassis frame having a reduced channel-shaped portion to be secured to the frame member, a downwardly depending housing portion for a cushion connection with a vehicle spring, a seat for a radiator, a seat for a support for the front end of a motor, and a seat for a yielding non-metallic connection with a bumper.

15. As an article of manufacture, a unitary front end member for a chassis frame having a reduced channel-shaped portion to be secured to the frame member, a downwardly depending housing portion for a cushion connection with a vehicle spring, a seat for a cross frame member, a seat for a radiator, a seat for a support for the front end of a motor, and a seat for a yielding non-metallic connection with a bumper.

This specification signed this 11th day of February A. D. 1926.

ALFRED F. MASURY.